(No Model.) 6 Sheets—Sheet 1.
A. KIESOW.
LAMP.

No. 557,829. Patented Apr. 7, 1896.

Witnesses:
Walter E. Allen
Geo. E. Cruse

Inventor:
August Kiesow.
By Knight Bros.
Attorneys (No Model.) 6 Sheets—Sheet 2.
A. KIESOW.
LAMP.

No. 557,829. Patented Apr. 7, 1896.

Witnesses.
Walter E. Allen.
Geo. E. Cruse.

Inventor.
August Kiesow.
By Knight Bros.
Attorneys.

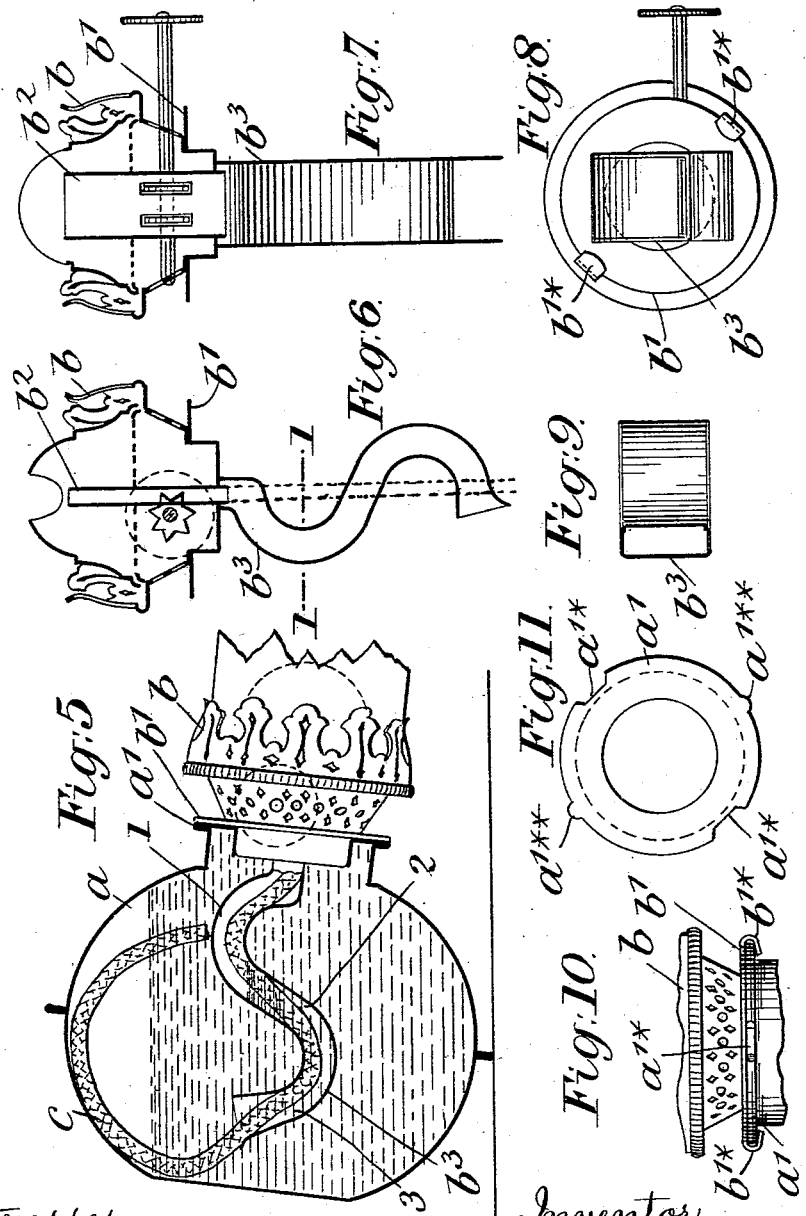

(No Model.) 6 Sheets—Sheet 4.
A. KIESOW.
LAMP.
No. 557,829. Patented Apr. 7, 1896.
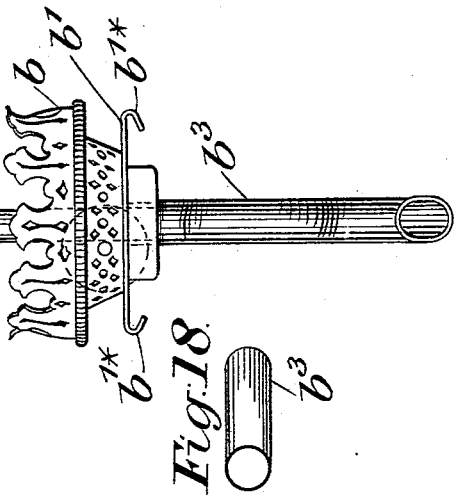
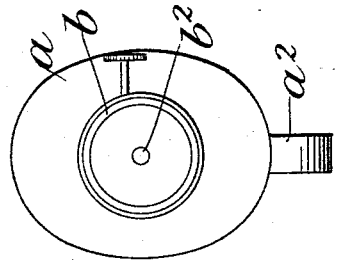
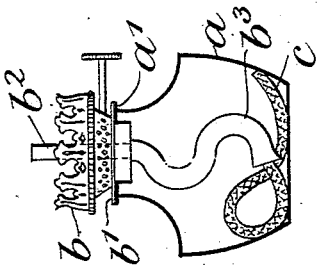
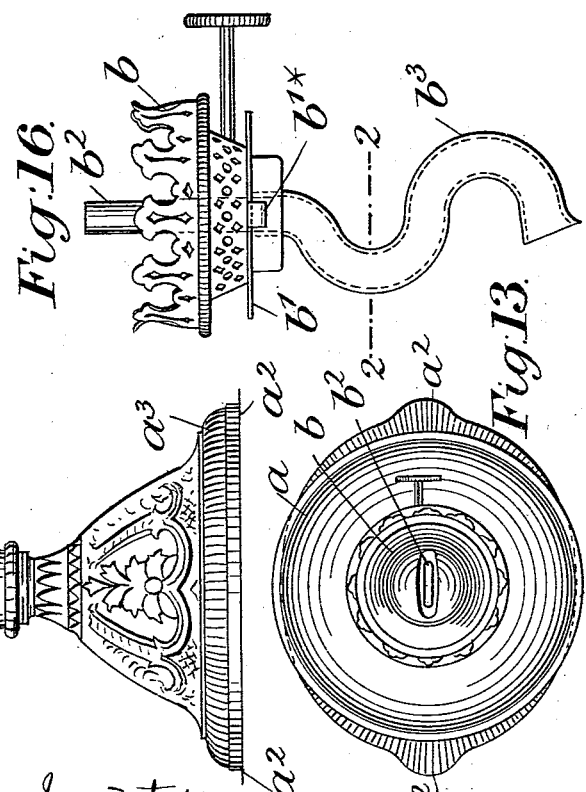
Witnesses.
Walter E. Allen.
Geo. E. Cruse.
Inventor:
August Kiesow.
By Knight Bros.
Attorneys.

(No Model.) 6 Sheets—Sheet 5.

A. KIESOW.
LAMP.

No. 557,829. Patented Apr. 7, 1896.

Witnesses.
Walter E. Allen.
Geo. E. Cruse.

Inventor.
August Kiesow.
By Knight Bros.
Attorneys.

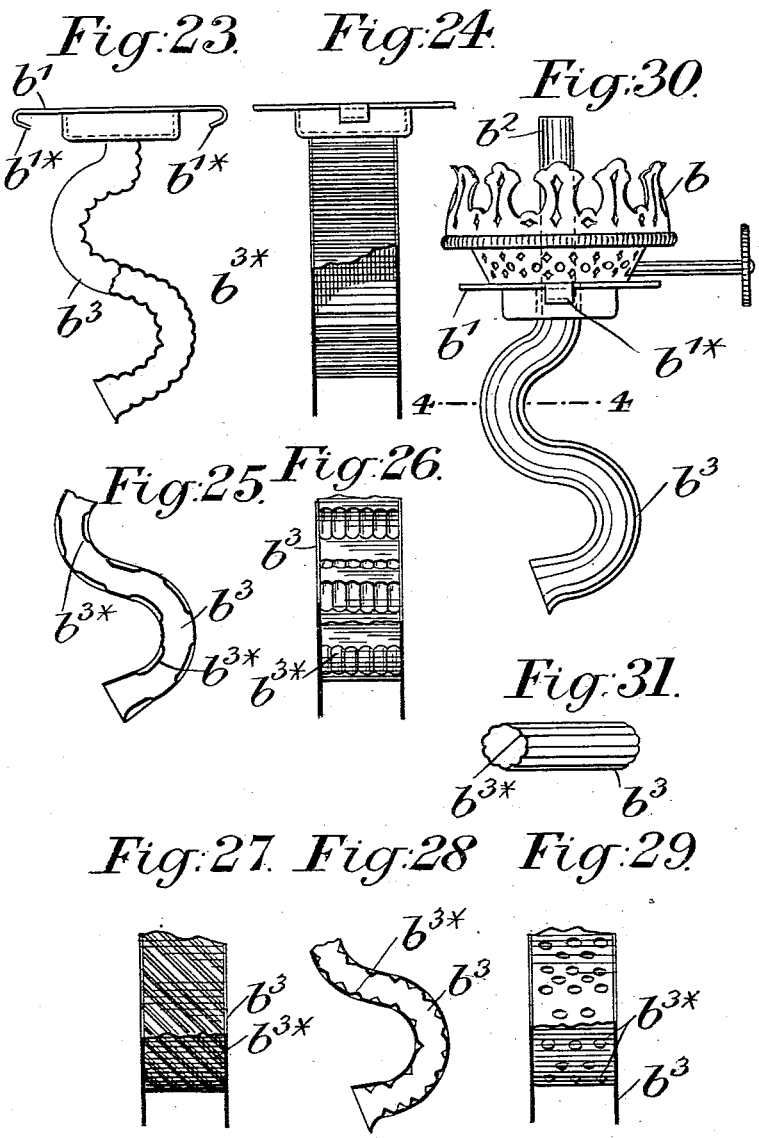

UNITED STATES PATENT OFFICE.

AUGUST KIESOW, OF LONDON, ENGLAND.

LAMP.

SPECIFICATION forming part of Letters Patent No. 557,829, dated April 7, 1896.

Application filed March 28, 1895. Serial No. 543,580. (No model.)

*To all whom it may concern:*

Be it known that I, AUGUST KIESOW, lamp manufacturer, a subject of the Emperor of Germany, residing at 25 Fore Street Avenue, in the city of London, England, have invented certain new and useful Improvements in or Connected with Lamps for Burning Oil or Spirit, of which the following is a specification.

The invention relates more especially to lamps intended for burning volatile oil, but it is also applicable to benzoline and other lamps.

A common cause of serious accident is the upsetting of mineral-oil lamps, inasmuch as when a lamp of that class is overturned the oil will flow freely through the wick-tube and will become ignited and rapidly spread over the floor, thus causing serious injury to property and frequently destroying or endangering life.

Many devices have been suggested for preventing the spilling of the oil under the above conditions, but hitherto they have all been more or less defective or too costly to enable them to come into general use, and there has consequently been no practical solution of the difficulty.

Now the object of the present invention is, at little or no additional cost, to construct a lamp in such manner that upon the overturning thereof the oil, with the exception of perhaps a few drops, will be trapped and prevented escaping, and thus any danger from fire will be completely avoided. The additional cost of constructing a lamp of this character is so small that lamps of the cheapest kind, which are used among the poorer classes, where accidents most frequently happen, can be fitted with the present improvements.

In order that the said invention may be more clearly understood and readily carried into effect, I will proceed, aided by the accompanying drawings, more fully to describe the same.

Figure 1:
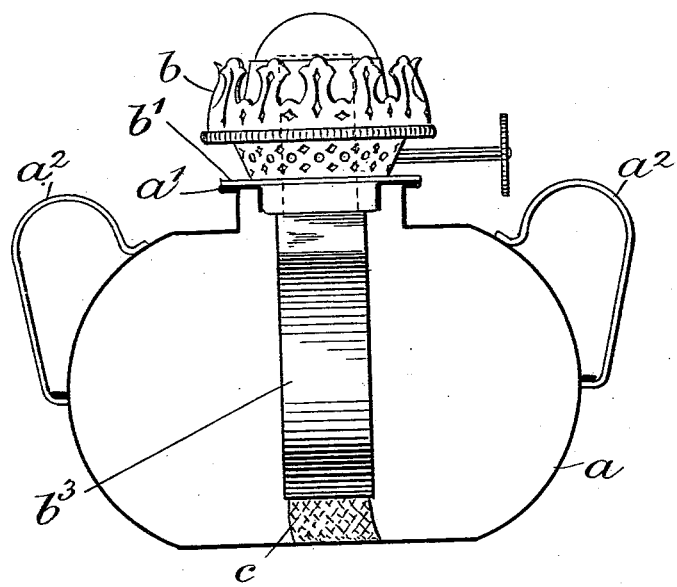
Figure 2:
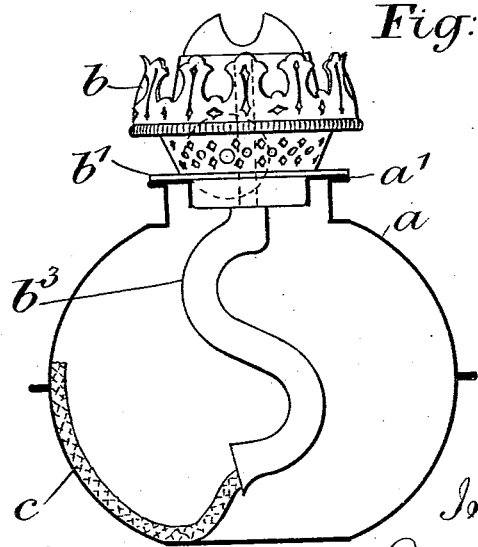
Figure 3:
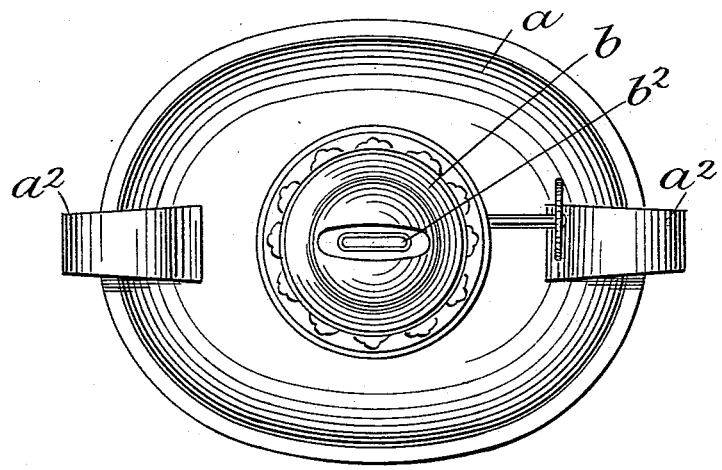
Figure 4:
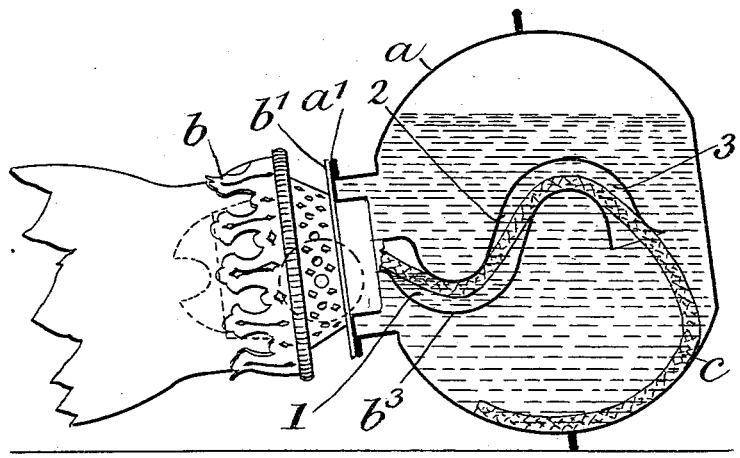
Figure 19:
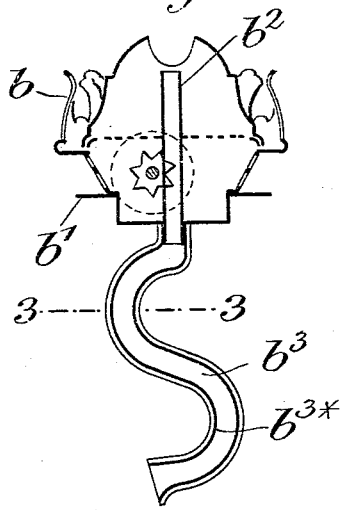
Figure 20:
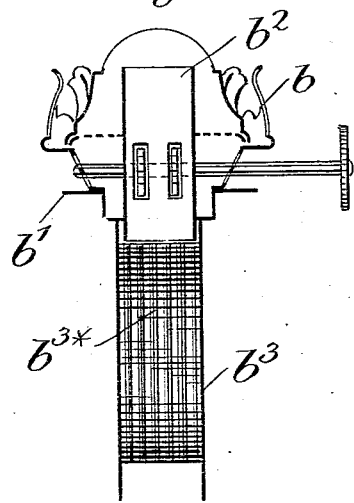
Figure 22:
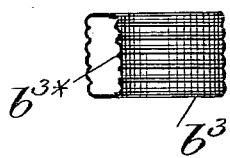
Figure 21:
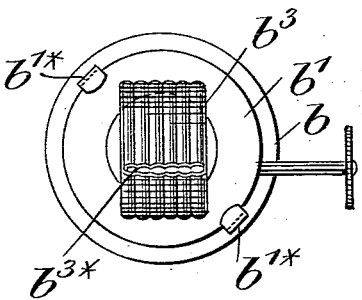

Figure 1 is a side elevation, partly in section, of a flat-wick mineral-oil lamp constructed according to the present invention. Fig. 2 is an end elevation thereof, partly in section. Fig. 3 is a plan thereof. Fig. 4 is a transverse section of the lamp, showing the same lying upon its side or in a capsized position. Fig. 5 is a similar view showing the lamp lying upon its opposite side. Fig. 6 is a vertical section of the burner and waved wick-case separately. Fig. 7 is a similar view to Fig. 6, but taken at right angles thereto. Fig. 8 is an under side view thereof. Fig. 9 is a horizontal section of the waved wick-case, taken on the line 1 1 of Fig. 6. Fig. 10 is an elevation of a portion of the burner, and Fig. 11 is a plan of the burner-fitting. Fig. 12 is a side elevation of a mineral-oil lamp, representing a slight modification. Fig. 13 is a plan thereof. Fig. 14 is a vertical section representing the application of the invention to a round-wick spirit-lamp or the like. Fig. 15 is a plan thereof. Fig. 16 is an elevation of the burner and waved wick-case drawn to an enlarged scale. Fig. 17 is a similar view but drawn at right angles to Fig. 16. Fig. 18 is a horizontal section of the waved wick-case, taken on the line 2 2 of Fig. 16. Fig. 19 is a vertical section representing a burner furnished with a waved or S-shaped wick-case on its interior provided with longitudinal flutings forming projections. Fig. 20 is a side view thereof. Fig. 21 is an under side view thereof. Fig. 22 is a horizontal section taken on the line 3 3 of Fig. 19. Fig. 23 is an edge elevation, partly in section, representing a modified form of wick-case. Fig. 24 is a side elevation thereof, partly in section. Fig. 25 is a vertical transverse section of a portion of a wick-case, representing a further modification; and Fig. 26 is a side elevation thereof, partly in section. Fig. 27 is a side elevation of a portion of a wick-case, representing a further slight modification. Fig. 28 is a vertical transverse section of a portion of a wick-case, representing a further slight modification; and Fig. 29 is a side elevation thereof, partly in section. Fig. 30 is an elevation of a round wick benzoline or spirit lamp having the present invention applied thereto, and Fig. 31 is a horizontal section taken on the line 4 4 of Fig. 30.

In the several figures like parts are indicated by similar letters of reference.

Referring to Figs. 1 to 11, $a$ represents the reservoir or container of the lamp. $a'$ represents the burner-fitting, which is fixed with the container $a$, and $b$ represents the burner, which may be constructed in any well-known manner, so as to make a hermetically-tight joint, or approximately so, with the reservoir or container $a$. In the present example this joint consists of a ring or flange $b'$ upon the burner provided with clips $b'^*$, which are adapted to pass through corresponding notches or openings $a'^*$, formed in and take under the corresponding ring or flange $a'$ of the burner-fitting, while $a'^{**}$ represents stops which engage the clips $b'^*$, and thus insure the burner occupying the required definite position with relation to the reservoir or container $a$.

$c$ represents the wick, and $b^2$ represents the ordinary wick-tube inclosing the same while in continuation of the wick-tube and beneath the same and fixed with the burner $b$; but preferably of greater area in transverse section than the wick-tube $b^2$ is arranged a wick-case $b^3$ of waved form, which extends near to the bottom of the container $a$.

The wick-case $b^3$ is formed in transverse section of an oblong rectangular form, as shown more particularly at Fig. 9, and instead of being straight, or approximately so, it is formed more or less of a regular or irregular waved corrugated or S shape in the direction of its length, each loop or bend of the S being in the preferred form carried completely beyond a vertical line drawn in continuation of the side of the tube or case $b^3$, as shown by the dotted lines in Fig. 6, so that when the lamp is lying upon its side, with the broad side of the wick case or tube $b^3$ in a horizontal position, as represented at Fig. 4 or Fig. 5, the lower or under side of one of the loops or bends of the S will lie above a straight line drawn in continuation of the upper side of the tube or case $b^3$ or thereabout, having regard to its assumed horizontal position; but it will be evident that this form of the wick-case $b^3$ may be more or less varied without departing from the spirit of the invention.

It is desirable that the bend of the wick-case $b^3$ should not be more pronounced than this, inasmuch as it might impede the free movement of the wick by the winder; but nevertheless the more pronounced the bends are made the better the device will act in other respects.

In order to insure the successful action of the device, it is necessary that the lamp should, when overturned, lie with the broad side of the wick tube or case $b^3$ in a horizontal position, or approximately so, and with a view to prevent its assuming any other position the oil container or reservoir $a$ is constructed with oval or they might be flat sides, as shown more particularly at Fig. 3, corresponding in position with each broad side of the wick tube or case $b^3$, so that upon the lamp being overturned it will naturally lie upon one of its sides and with the wick case or tube $b^3$ in a horizontal position, or approximately so, as represented at Figs. 4 and 5.

The lamp is also provided with two projecting handles $a^2$, fixed to the ends of the reservoir or container $a$, which more or less assist the action above described, or projections of other form might be substituted for the handles $a^2$, or the projections or handles might be dispensed with, or any other well-known means might be employed to compel the lamp to assume the desired position when overturned.

In the example given at Figs. 12 and 13 the container or reservoir $a$ is supported upon a pedestal furnished with a foot or base $a^3$, and in this case the reservoir or container $a$, instead of being formed oblong, is circular in plan, while the foot or base $a^3$ is formed oblong or oval and with end projections $a^2$, and the effect of this formation of the base or foot $a^2$ is to cause the lamp, upon its being overturned, to assume the required position, as hereinbefore described with respect to Figs. 1 to 11.

In the example given at Figs. 14 to 18 the invention is shown applied to a well-known form of round-wick burner, constructed to burn benzoline or spirit. In this case the device is substantially identical with that hereinbefore described, except that the wick-case $b^3$ is formed of the same shape as the wick—that is to say, of a round section. The container or reservoir is formed of a similar oblong shape to that described with respect to Figs. 1 to 11, and with the same object, but only one projection in the form of a handle $a^2$ in this case is employed.

In the example given at Figs. 19 to 22 the waved or S-shaped wick-case $b^3$ is at its sides formed fluted in the direction of its length, as will be seen more particularly upon reference to Figs. 21 and 22, or it might be waved or corrugated. The flutings or corrugations are so formed upon the interior of the wick-case $b^3$ as to constitute projections $b^{3*}$, which have for their object to hold the wick $c$ off the general surface of the wick-case $b^3$, for the purpose hereinafter more fully referred to.

In the example given at Figs. 23 and 24 the flutings are formed in the sides of the wick-case $a$ transversely thereof; while in the example given at Figs. 25 and 26 the flutings are formed vertically of the wick-case, but broken or irregular, that is to say they are only formed at intervals therein.

In the example given at Fig. 27 the flutings are formed diagonally of the wick-case $b^3$, while in the example given at Figs. 28 and 29 the sides of the wick-case are formed with a number of internally-projecting conical or they might be rounded studs or projections.

In the example given at Figs. 30 and 31 a round-wick benzoline or spirit burner is shown fitted with a wick-case $b^3$, formed with longitudinal flutings similar to those hereinbefore shown and described with respect to Figs. 19 to 22.

The corrugations, flutings, or projections are so formed upon the interior of the wick-case $b^3$ as to offer a very small surface to the contained wick $c$, and thus the surface contact of the wick c with the wick-case b³, and more especially at the bends, is not sufficient to impede the capillary action of the wick; but the flutings, corrugations, or projections permit a flow of air and oil along the wick c, and the supply of oil to the flame is thus rendered sufficient to give the best results in the burning of the lamp.

It will be evident that the form of the projections upon the interior of the wick-case b³ may be varied according to circumstances without departing from the spirit of the present invention.

The action of the device is as follows: Upon the lamp being overturned into the position represented at Fig. 4 only a few drops of oil will escape from the wick-tube b² and the upper part of the wick-case b³; but no flow of oil from the reservoir or container a will take place, inasmuch as air cannot enter through the wick-case b³ to release the fluid in the container a—that is to say, in the position represented at Fig. 4, the air would require to descend through the column of oil contained in the parts 1 and 3 of the wick-case, while, should the lamp fall into the opposite position, as represented at Fig. 5, the air would encounter and require to descend through the column of oil contained in the part 2 of the wick-case in order to release the fluid from the reservoir or container a, and inasmuch as air will not descend through a column of fluid, except under something more than ordinary atmospheric pressure, it follows that a supply of air cannot enter the reservoir or container a through the wick-case b³, and consequently the contained oil is unable to flow therefrom. It will therefore be seen that by the employment of the means hereinbefore described in the event of a lamp being overturned it will be impossible for more than a few drops of oil to escape, as the flow thereof will be arrested by the peculiar formation of the waved or S-shape tube or case b³, and thus any danger of fire from the overturning of the lamp will be obviated.

Although the invention is intended more particularly for application to lamps designed to burn mineral oil or spirit, it will be evident that it is also applicable, although not with the same advantages, to lamps intended for burning heavy vegetable or other oils.

I would here remark that I do not confine myself to the precise form of the wick-case represented in the drawings, as, although such form is the best that I am at present acquainted with, it will be evident that the same may be more or less varied without departing from the spirit of my invention. For example, the wick-case might be formed with a greater number of bends than are shown in the drawings, and it might be of the same area in transverse section as the wick-tube; but such arrangement would be inferior to that herein shown and described and which is the preferred form of the invention.

Having now particularly described and ascertained the nature of the said invention and in what manner the same is to be performed, I declare that what I claim is—

1. In combination with a lamp or lamp-burner, a wick-case of S shape in the direction of its length descending into the reservoir or container, substantially as herein shown and described and for the purpose stated.

2. In combination with a lamp or lamp-burner, a wick-case waved or S-shaped in the direction of its length descending into the reservoir or container and means for causing the lamp and consequently the wick-case upon overturning to assume a given position, substantially as herein shown and described and for the purpose stated.

3. In combination with a lamp or lamp-burner, a wick-case of S shape in the direction of its length descending into the reservoir or container and upon its interior formed with continuous or broken projections, substantially as herein shown and described and for the purpose stated.

4. In combination with a lamp-burner, a wick-case waved or S-shaped in the direction of its length descending into the reservoir or container, means for causing the lamp and consequently the wick-case upon overturning to assume a given position, and a stop carried by the reservoir or container for insuring the wick-case on being attached to the reservoir assuming a given position with relation thereto, substantially as herein shown and described and for the purpose stated.

AUGUST KIESOW.

Witnesses:
C. M. MOURNEBLUTE,
C. H. WHITE.